Dec. 15, 1953  A. PETERSON  2,662,342
EDGING AND TRACKING MEANS FOR WALKWAYS AND THE LIKE
Filed May 8, 1950
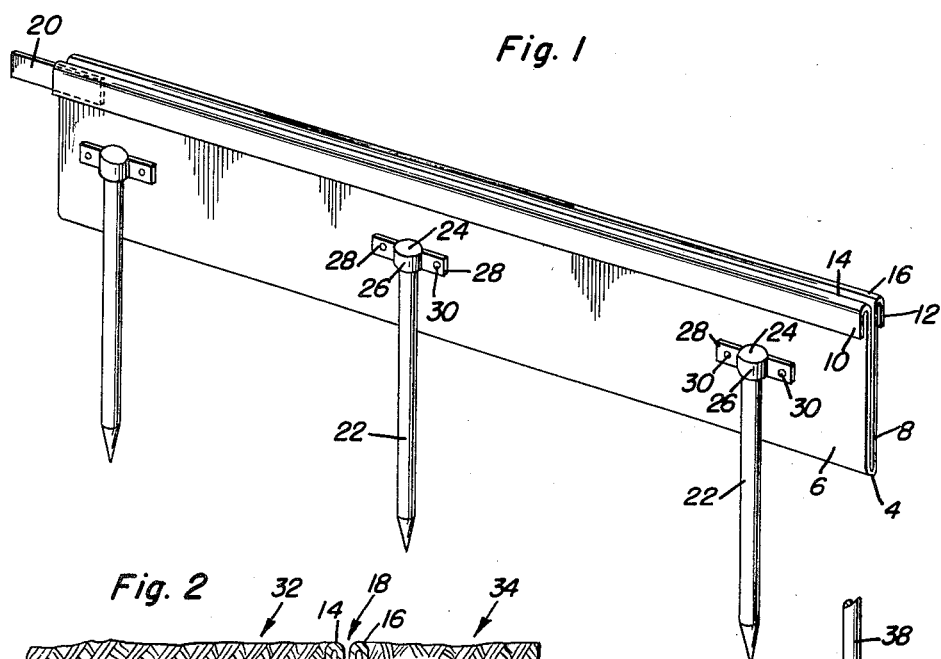
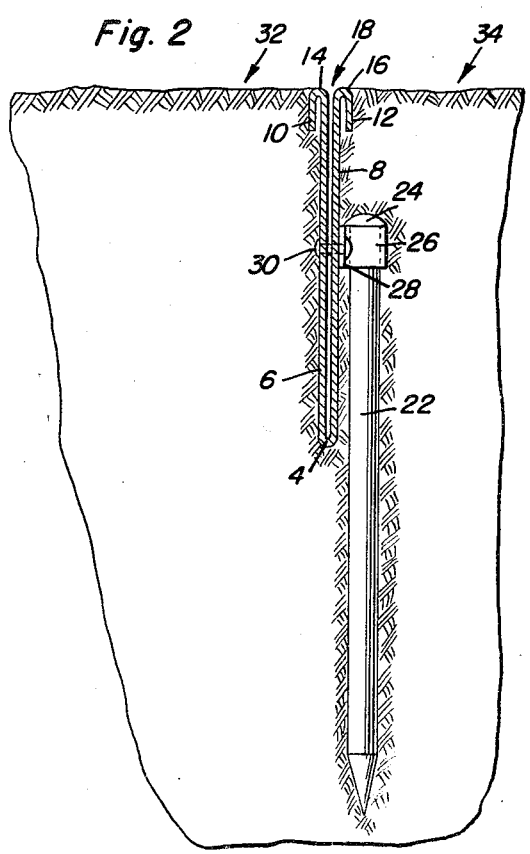
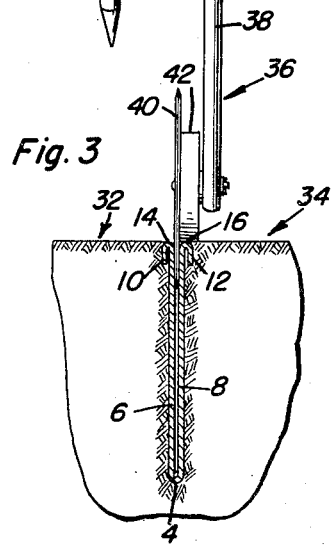
Arthur Peterson
INVENTOR.

Patented Dec. 15, 1953

2,662,342

UNITED STATES PATENT OFFICE 2,662,342

EDGING AND TRACKING MEANS FOR WALKWAYS AND THE LIKE

Arthur Peterson, Havertown, Pa.

Application May 8, 1950, Serial No. 160,707

4 Claims. (Cl. 47—33)

The present invention relates to lawn edging, trimming and beautifying means broadly and, more specifically, has to do with an especially constructed boundary marking edger guiding device which is adapted to be placed along marginal edge portions of flagstone and equivalent walkways, concrete and equivalent driveways, flower beds and the like to function as a divider and to facilitate the act of trimming grass easily and speedily.

Considerable time and thought has been given to the promotion of special edging tools and ways and means of enabling home owners and gardeners to maintain marginal edge portions of lawns neat and trim. For the most part the average home owner attempts to meet the varying requirements partly with a conventional lawn mower, with different types of scissors-like clippers, various types of edging tools; or perhaps by digging a marginal trench and thus bevelling the edges of the lawn to prevent the blades of grass from climbing and extending over driveways, walkways and the like.

There is an edging tool on the market which employs a handle which is provided on its lower end with a roller and a complemental sharp-edged cutting and edging disc. This is a handy and generally a satisfactory tool and with said tool in mind I have evolved and produced a ways and means to expedite its practical utility in trimming up and edging a lawn with requisite nicety. In carrying out a preferred embodiment of the invention I contemplate the adoption and use of a sheet material (usually light weight sheet metal) elongated sheath-like track which is channel-shaped in cross-section. The stated track is adapted to be embedded in a trench in the ground or other equivalent foundation at a predetermined point. The upper edges of the side walls of the channel are fashioned into trackways, either of which may be selectively used to rollably support and guide the roller on the stated edging tool, the space or channelway between the walls serving to accommodate and permit the cutting disc to run along freely therein and to nip all grass growing across the channelway, thus providing a sharply defined area dividing line coincident with the channel.

More specifically, the invention has to do with a sheet metal channel-shaped form which is completely embedded in the ground in a manner to line the walls of the trench and which is provided with anchoring stakes to facilitate retention of the form, wherein the upper contiguous edges of the side walls of the channel are bent outwardly and then downwardly to provide tracking and guiding flanges. In this connection the flanges are disposed in close proximity to the exterior surfaces of the respective walls to assist in providing a rigid sheath or track and also to provide stable crown-bends serving as stable trackways.

Other objects and advantages will become more readily apparent from the following description and the accompanying illustrative drawings.

In the accompanying sheet of drawings, wherein like numerals are employed to designate like elements throughout the several views:

Fig. 1 is a perspective view of an edging form constructed in accordance with the invention showing the anchoring stakes for same;

Fig. 2 is a view in section and elevation showing the edging form and the manner in which it is set and staked in a trench in the ground to mark or define a division line between a flower garden or bed on one hand and an associated lawn on the other hand; and Fig. 3 is a view based on Figure 1 but on a smaller scale and showing the manner in which a marketed type of rollable edging tool is aptly used in connection with the edging form.

By way of introduction to the specification, it is to be pointed out that the invention is adapted for use in delineating as well as marking the metes and bounds of a lawn, the dividing line between a garden and lawn and also is useful in edging the borders of walkways, driveways, and similar prominent areas. Briefly, it is characterized as a new article of manufacture comprising a form which may be treated as a liner for a trench and also as a trimmer guide. It is of sheet material and is channel-shaped in cross-section and the walls thereof are resilient. The inherent resilient properties are so confined and arranged that the upper edges of the walls are forceably sprung together and are thus normally maintained in close spaced proximity so that the mouth of the channel is virtually closed. The walls are, because of this construction, adapted to be momentarily sprung apart when a cutting disk or equivalent grass trimmer or instrumentality is forced and wedged between said walls to spread the same apart.

Referring now to the several views of the drawings by reference numerals and accompanying lead lines it is to be stated that each edging device or form is fashioned from sheet material and is preferably formed from a bendable sheet of metal or equivalent non-corrosive material, the same being bent upon itself as at 4 to define spaced duplicate parallel side walls 6 and 8 which are spaced apart in parallelism to define a channelway between themselves. The channel way is open at opposite ends, obviously. The upper edge portions of the channel walls are bent outwardly and downwardly to form depending stabilizing and keying flanges 10 and 12. The flanges are spaced from their respective walls and the crown edges or bends, in turn, define runners or tracks 14 and 16. The space between the side walls constitutes the channelway 18. These channel-shaped forms will be of suitable lengths so that they may be laid end to end and interconnected by coupling tongues 20. The tongue which extends from one flange 10 would be fitted into the coacting flange of another channel section (not shown) and the coacting flange clenched to bind it against tongue 20 to in this way connect several forms together and in relationship in an obvious manner. It is also possible to have the forms brought together in right angular relationship and to use the tongues 20 for such purposes. I am not interested in an over-all assemblage of forms but in the construction of a single form as shown in the drawings and the combination thereof with a trench in the ground. The forms are press fitted into a trench which is dug in the ground and are held against displacement by a plurality of pointed stakes 22. Each stake has a headed upper end 24 which is driven down against a U-shaped bracket 26 having end portions 28 secured by rivets or the like 30 through the channel walls 6 and 8. These brackets are located below the track flanges 10 and 12 in the approximate positions shown in Fig. 2. The stated brackets 26 may, of course, be secured in place by welding, soldering or otherwise.

The forms will be of appropriate sizes. They will be preferably five inches in depth but can be deeper or shallower depending on the type of vegetation roots to be excluded from the garden. It has been determined from experiments that forms which are five inches will be deep enough to take care of most garden situations.

As stated the object of the invention is to facilitate the edging of lawns at points adjacent the flower gardens, sidewalks, driveways and so on and so forth. The forms may be used for dual purposes, that is each (a) may serve as a form for construction work in laying sidewalks or driveways at the time of building same and (b) after construction is completed, may be left in position for edging the grass when it grows. In Fig. 2 I show one of the devices embedded in the trench where it constitutes a divider for a flower bed 32 on the left and a lawn 34 on the right. By having the crown portions or tracks 14 and 16 flush or substantially so with the ground the edging implement 36 of Fig. 3 may be employed. It comprises a handle 38, a cutting disc 40 which rolls along in the channelway 18 and a traction roller 42 which may be rolled along either of the guiding tracks 14 or 16 as the case may be. With the aid of this suitably staked form one may edge and trim a lawn in little or no time and with a minimum of effort and patience expanded.

The invention may be interpreted, obviously, as a sheath which is sufficiently rigid to serve the intended purposes and which is nevertheless such that it may be bent into an arc or for that matter, actually bent into serpentine or equivalent compound curvatures depending on the contour of the boundary line between a flower garden and lawn. It is to be repeated that the innate springy metal properties of the opposed side walls of the sheath caused the upper edges of the sheath to be directed toward each other and to be in close proximity but capable of being spread apart when the cutting instrumentality is inserted and moved along in an obvious fashion. Actually the drawings in this case show "daylight" between the upper edges but in actual practice these upper edges are virtually in metal-to-metal contact. This means that the "mouth" of the channel or sheath is substantially closed to keep out dirt and debris. It is an aim of the invention to make gardens more beautiful with less work. The invention can be installed around the base of trees and bushes and will keep the appearance neat and even. It smooths out rough edges of sidewalks and allows for quick and easy trimming. By placing the cutting wheel in the channel and walking, a scissors-like action serves to clip the grass across the mouth of the channel so that the remaining edge is neat and clean. The use of this device minimizes hard work in gardening and obviates unnecessary stooping and bending. Actually in a few minutes the trimming of a yard is done and the occupants will be enjoying the satisfaction of seeing the garden neater and more beautiful than ever before. The presence of the sheath confines the garden to the desired space. Under the old spade method of edging, the flower garden increased in size each time the work was done, besides it looked its best only immediately after the work was done. With this device in place, the lawn grows up to the garden but cannot go further. With this device it is possible to keep grass roots under control and to eliminate a large amount of weeding now encountered when no confining edging devices are available.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

1. For use in conjunction with a prepared plot of ground having a trench dividing said plot into at least two distinct areas with one area serving as a lawn and the other area serving as a vegetable or flower garden, driveway, walkway or the like; a new article of manufacture comprising a trench lining and trimmer guiding form of sheet material, said form being channel-shaped in cross-section and the walls thereof being resilient and the inherent resiliency being such that the upper edges of the walls are sprung together and are thus normally maintained in close-spaced proximity so that the mouth of the channel is thus virtually closed, said walls being adapted to be momentarily sprung apart when a cutting disk or an equivalent grass cutting instrumentality is wedged between said walls.

2. The structure defined in claim 1 wherein said form is constructed from a gage of metal which is bendable at points between the opposite transverse ends of the form so that the latter may be satisfactorily fitted and held in trenches which are of serpentine, circular, or other plan configuration.

3. The structure defined in claim 1 and anchoring stakes mounted on the exterior surface of at least one of the walls of the form, said stakes being pointed at their lower ends to extend below the bight portion, the upper ends of the stakes being disposed in planes spaced downwardly from the adjacent upper edges of the walls and the upper ends of said stakes being in closer proximity to the upper edges of the walls than to the bight portion.

4. The structure defined in claim 2 wherein the upper edges of said walls are provided with outwardly and downwardly bent reinforcing flanges, said flanges being in close association with the exterior surfaces of said walls and the lengthwise bend of the flanges providing run-along tracks as well as selectively usable shearing elements cooperable with the stated grass cutting implement.

ARTHUR PETERSON.

References Cited in the file of this patent

UNITED STATES PATENTS

| Number | Name | Date |
|---|---|---|
| 604,676 | Follansbee | May 24, 1898 |
| 1,033,431 | McCarthy | July 23, 1912 |
| 2,041,240 | Gluesing | May 19, 1936 |

FOREIGN PATENTS

| Number | Country | Date |
|---|---|---|
| 15,425 | Great Britain | Nov. 26, 1886 |
| 215,529 | Great Britain | May 15, 1924 |